United States Patent
Kirchner et al.

(10) Patent No.: US 8,052,128 B2
(45) Date of Patent: Nov. 8, 2011

(54) SELF-PUMPING HYDROPNEUMATIC SPRING STRUT

(75) Inventors: Holger Kirchner, Ruppichteroth (DE); Hubert Beck, Eitorf (DE); Thomas Meyer, Siegburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 695 days.

(21) Appl. No.: 12/206,375

(22) Filed: Sep. 8, 2008

(65) Prior Publication Data

US 2009/0065991 A1  Mar. 12, 2009

(30) Foreign Application Priority Data

Sep. 8, 2007 (DE) .................. 10 2007 042 864

(51) Int. Cl.
 *B60G 17/00* (2006.01)
(52) U.S. Cl. ............... 267/64.17; 188/313; 267/DIG. 2; 267/64.19
(58) Field of Classification Search .... 267/64.15–64.28, 267/DIG. 2; 188/313
See application file for complete search history.

(56) References Cited

U.S. PATENT DOCUMENTS

| | | | | |
|---|---|---|---|---|
| 4,624,346 A * | 11/1986 | Katz | ............... | 188/282.9 |
| 5,713,562 A * | 2/1998 | Beck | ............... | 267/64.17 |
| 6,648,309 B2 * | 11/2003 | Beck | ............... | 267/64.17 |
| 7,036,802 B2 * | 5/2006 | Beck | ............... | 267/64.17 |
| 7,370,849 B2 * | 5/2008 | Beck | ............... | 267/64.17 |

FOREIGN PATENT DOCUMENTS

DE  101 04 358 C1  10/2002

* cited by examiner

*Primary Examiner* — Melanie Torres Williams
(74) *Attorney, Agent, or Firm* — Cozen O'Connor

(57) ABSTRACT

A self-pumping hydropneumatic spring strut with internal leveling control, particularly for motor vehicles, has an outer tube having an oil-filled high-pressure work space in the work cylinder, which high-pressure work space is under pressure by at least one gas cushion which is arranged in a high-pressure chamber and acts as a spring, a second work space on the piston rod side, and a piston which is supported by a hollow piston rod and which is axially displaceable in the work cylinder in a sealed manner, a piston pump which is driven by the spring movement of the vehicle and pumps oil out of a low-pressure chamber into the work space connected to the high-pressure chamber and which comprises a pump rod and a pump cylinder which is formed by the hollow piston rod, and the high-pressure chamber can be connected to the atmosphere by a flow connection which is arranged in the piston rod guide and has a closing element. The piston rod is sealed in the piston rod guide by means of at least two seals which are arranged one behind the other axially. A flow connection extends from between two adjacent seals into the low-pressure chamber. The flow connection is acted upon by a check valve which passes damping medium only in direction of the low-pressure chamber.

12 Claims, 2 Drawing Sheets

SELF-PUMPING HYDROPNEUMATIC SPRING STRUT

CROSS-REFERENCE TO RELATED APPLICATION

BACKGROUND OF THE INVENTION

1. Field of the Invention

Disclosed is a self-pumping hydropneumatic spring strut with internal leveling control, particularly for motor vehicles.

2. Description of the Related Art

Spring struts in which the high-pressure chamber is connected to a flow connection arranged in the piston rod guide are known, e.g., DE 101 04 358 C1, FIG. 7 and FIG. 8. A fill hole, arranged in the outer tube, communicates with a flow connection in the incompletely assembled state of the piston rod guide. The fill hole is closed by the piston rod guide after the piston rod guide is inserted axially into the outer tube. A closed sleeve body whose shape can be changed and whose wall comprises a gastight barrier layer is provided as a high-pressure chamber. This design is advantageous for several reasons. The necessary internal parts such as the high-pressure chamber, the piston, the piston rod and the pump rod together with the piston rod guide, are inserted axially into the outer tube of the spring strut. Second, the spring strut is operational after filling at least the high-pressure chamber with pressure gas through the fill hole. Third, the fill hole is closed by the piston rod guide after the piston rod guide along with the work cylinder and the rest of the internal parts, are pushed in further axially so that the spring strut is completely assembled after flanging the outer tube.

In order to ensure axial insertion of the piston rod guide, it is necessary that the seal is arranged between the piston rod guide and the piston rod so as to be pretensioned. This results in a correspondingly high friction. An individual seal of this kind under such high stress tends to leak toward the atmosphere because the internal pressure must be entirely contained by this seal.

SUMMARY OF THE INVENTION

It is the object of the invention to provide a self-pumping hydropneumatic spring strut with internal leveling control in which the frictional forces at the seal between the piston rod guide and piston rod are minimized, while ensuring a sufficient sealing of the internal space relative to the atmosphere.

In one embodiment, a self-pumping hydropneumatic spring strut is disclosed with an outer tube having an oil-filled high-pressure work space in the work cylinder, which high-pressure work space is under pressure by at least one gas cushion which is arranged in a high-pressure chamber and acts as a spring, a second work space on the piston rod side, and a piston which is supported by a hollow piston rod and which is axially displaceable in the work cylinder in a sealed manner, with a piston pump which is driven by the spring movement of the vehicle and pumps oil out of a low-pressure chamber into the work space connected to the high-pressure chamber and which comprises a pump rod and a pump cylinder which is formed by the hollow piston rod, and the high-pressure chamber can be connected to the atmosphere by a flow connection which is arranged in the piston rod guide and has a closing element.

According to one embodiment of the invention, the piston rod is sealed in the piston rod guide by means of at least two seals which are arranged one behind the other axially, and a flow connection extends from between two adjacent seals into a low-pressure chamber, and the flow connection is acted upon by a check valve which passes damping medium only in direction of the low-pressure chamber.

In this embodiment, leaked oil is returned to the low-pressure chamber by means of at least one additional seal and the flow connection arranged in the low-pressure chamber between two adjacent seals. The check valve serves as a gas barrier so that gas in the low-pressure chamber cannot escape into the atmosphere through the gap between the piston rod guide and the piston rod. Starting from the work space, the totality of internal pressure acts first on the first seal, while the subsequent second seal is exposed to a lower pressure so that the friction is initially reduced by a lower pretensioning of the seals at the piston rod to prevent pressure gas or even damping medium from exiting while simultaneously increasing the sealing against the atmosphere.

In order to fill the low-pressure chamber with pressure gas, a fill hole is arranged in the piston rod guide for filling the low-pressure chamber. It is advantageous that the fill hole opens directly or indirectly into the flow connection or that that the fill hole opens directly or indirectly into the low-pressure chamber.

In another embodiment, an O-ring is provided as a check valve. Preferably, a mass-produced O-ring is provided as check valve that prevents pressure gas from escaping either through the fill hole or through the gap between the piston rod guide and the piston rod when filling the low-pressure chamber with gas.

In one embodiment, the O-ring is received in a circumferential groove arranged at the piston rod guide.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
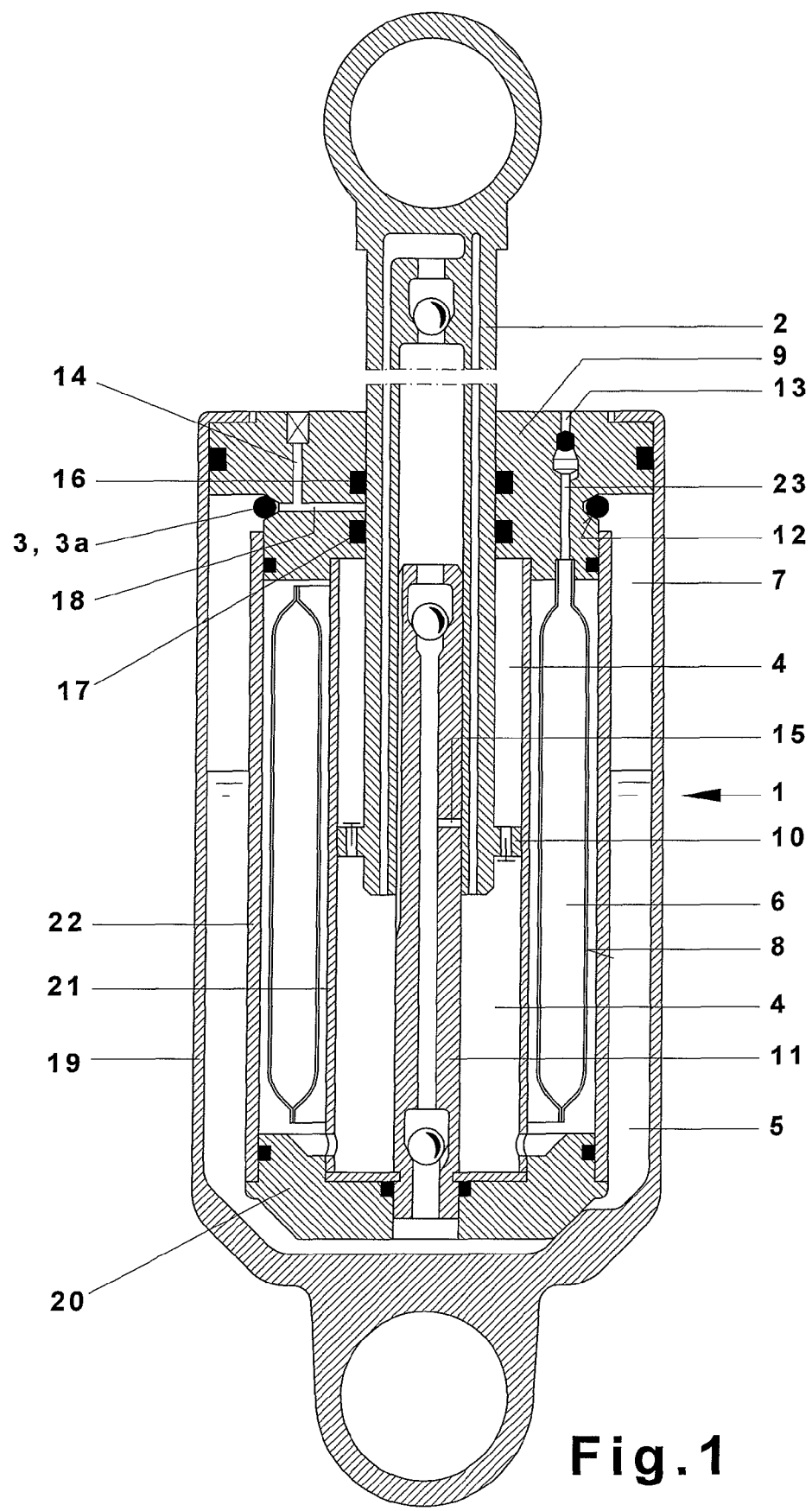
FIG. 1 shows a sectional view of an embodiment of a self-pumping hydropneumatic spring strut with internal leveling control.

FIG. 1 shows a self-pumping hydropneumatic spring strut 1 with internal leveling control in which the piston 10 is arranged in the work cylinder 21 and is fastened by a piston rod 2. The piston rod 2 is guided out of the outer tube 19 by the piston rod guide 9. The pump rod 11 is fastened to the base 20. This pump rod 11 penetrates into the hollow space of the piston rod 2 and these structural component parts together form the piston pump. An intermediate tube 22 is arranged coaxially inside the outer tube 19 and, together with the latter, forms the low-pressure chamber 5. The high-pressure chamber 6 which is formed of a sleeve body 8 as is configured to connect to the atmosphere via bore hole 23 and a fill hole 13. High pressure chamber 6 is arranged between the intermediate tube 22 and the work cylinder 21 and the sleeve body 8 is filled with pressure gas. The low-pressure chamber 5 is filled with damping medium as well as with a gas volume 7.

The work cylinder 21 is arranged coaxially inside the high-pressure chamber 6 and is divided into two work spaces by the damping piston 10. To regulate a vehicle's level, a discharge bore hole 15 is arranged in the pump rod 11 and produces a short circuit between the work space 4 and the hollow space of the pump rod 11 when the piston rod 2 is extended.

Two seals 16 and 17 are arranged one behind the other axially in the piston rod guide 9. A flow connection 18 extends between the seals 16 and 17 into the low-pressure chamber 5 and is provided with a check valve 3 preferably in the form of an O-ring 3a. The O-ring 3a is received in a circumferential groove 12 and, in this embodiment, serves as a gas barrier between the low-pressure chamber and the atmosphere. In order to fill the low-pressure chamber 5, the piston rod guide 9 has a fill hole 14 which opens directly or indirectly into the flow connection 18 or directly into the low-pressure chamber 5 (not shown).

Figure 2:
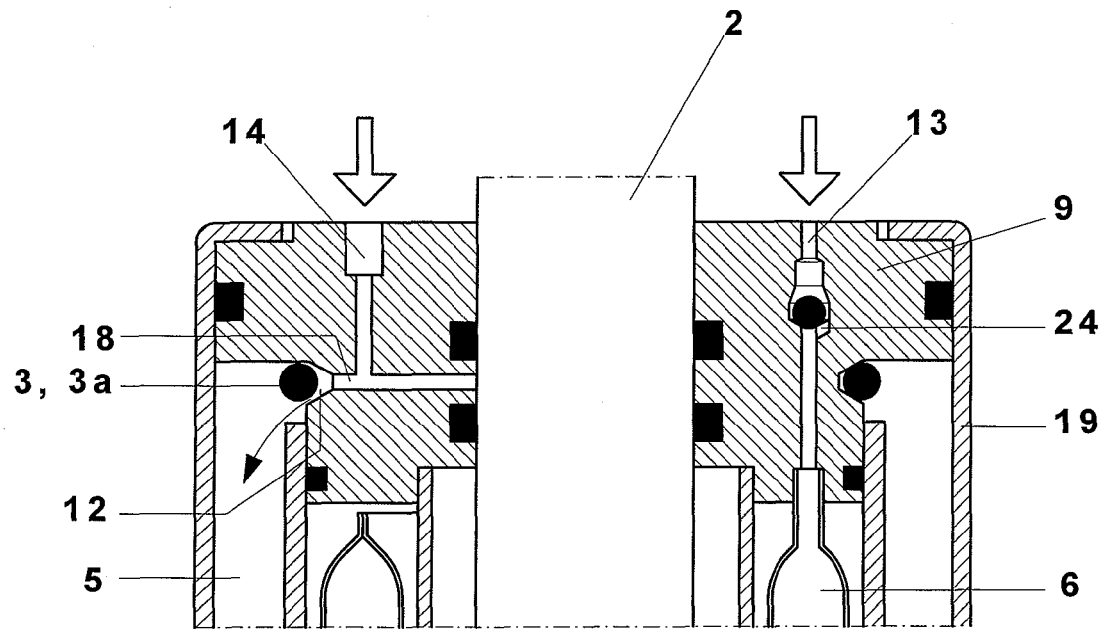
FIG. 2 and FIG. 3 show a detail of a piston rod guide with the corresponding flow connections and the seals and spring struts in section.
Figure 3:
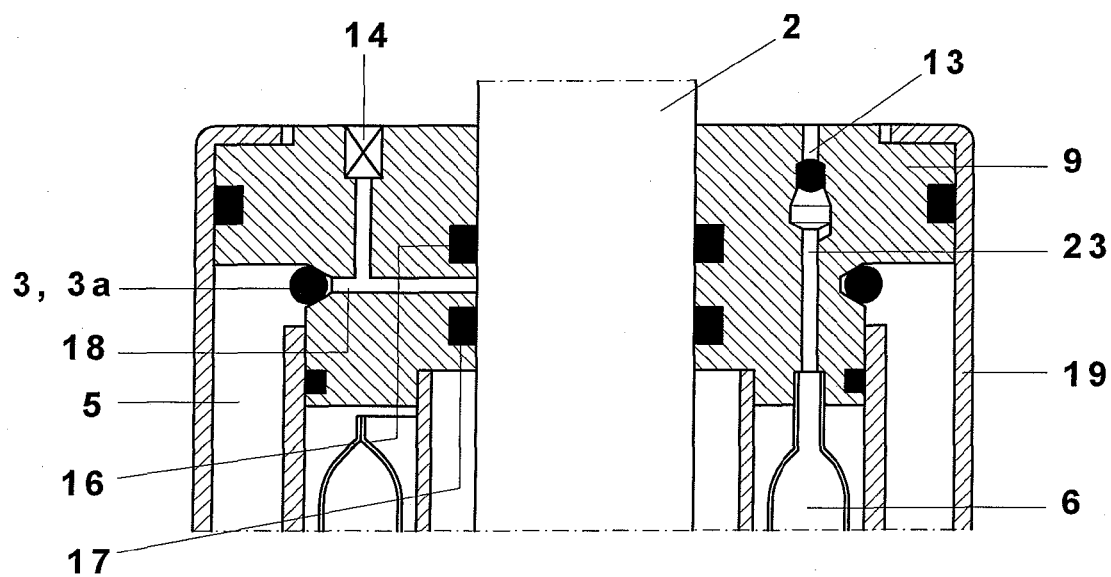

FIGS. 2 and 3 show a detail of a piston rod guide 9 arranged between the outer tube 19 and the piston rod 2. On the one hand, the bore hole 23 and the fill hole 13 are provided for filling the high-pressure chamber 6 with pressure gas. The fill hole 14 can fill the low-pressure chamber 5 with damping medium and/or pressure gas in the piston rod guide 9 via the flow connection 18 and check valve 3. In a preferred embodiment, high-pressure chamber 6 and low-pressure chamber 5 are filled simultaneously. The seals 16 and 17 serve to seal the piston rod 2 relative to the piston rod guide 9. The flow connection 18 is arranged between the seals 16 and 17 so as to extend into the low-pressure chamber 5 to reduce friction on the piston rod 2. Damping medium that is entrained by the piston rod during the outward movement of the piston rod is guided back into the low-pressure chamber 5 via the flow connection 18.

FIG. 2 shows that the check valve arranged in the fill hole 13 is in the open position when the high-pressure chamber 6 is filled with pressure gas so that the pressure gas can be introduced into the high-pressure chamber 6 via cutout 24. After the high-pressure chamber 6 is filled with pressure gas, the check valve in the bore hole 13 (FIG. 3) closes the fill hole so that the pressure gas cannot escape.

During the filling of the low-pressure chamber 5, shown in FIG. 2, the O-ring 3a rises from its valve seat (groove 12) so that the pressure gas can be introduced into the low-pressure chamber 5. After the low-pressure chamber 5 is filled, the O-ring 3a (FIG. 3) closes the flow connection 18 so as to be tight against pressure and liquid.

The invention is not limited by the embodiments described above which are presented as examples only but can be modified in various ways within the scope of protection defined by the appended patent claims.

We claim:

1. A Self-pumping hydropneumatic spring strut with internal leveling control for vehicles, comprising:
   an outer tube;
   a work cylinder arranged concentrically with the outer tube, the work cylinder defining a high-pressure work space in the work cylinder and a second work space, the high-pressure work space is under pressure by at least one gas cushion which is arranged in a high-pressure chamber and acts as a spring, the second work space is located on a piston rod guide side of the work cylinder; and
   a piston supported by a hollow piston rod and axially displaceable in the work cylinder in a sealed manner, the piston forming part of a piston pump which is driven by movement of the vehicle and is configured to pump oil out of a low-pressure chamber into a work space connected to the high-pressure chamber, the piston pump comprises a pump rod and a pump cylinder which is formed by the hollow piston rod, the high-pressure chamber is configured to be connected to the atmosphere by a flow connection arranged in the piston rod guide and has a closing element, wherein the piston rod is sealed in the piston rod guide by at least two seals which are arranged one behind the other axially, and a flow connection extends from between two adjacent seals of at least two seals into the low-pressure chamber, and the flow connection is acted upon by a check valve which passes damping medium only in direction of the low-pressure chamber.

2. The self-pumping hydropneumatic spring strut according to claim 1, wherein a fill hole is arranged in the piston rod guide for filling the low-pressure chamber.

3. The self-pumping hydropneumatic spring strut according to claim 2, wherein the fill hole opens directly or indirectly into the flow connection.

4. The self-pumping hydropneumatic spring strut according to claim 2, wherein the fill hole opens directly or indirectly into the low-pressure chamber.

5. The self-pumping hydropneumatic spring strut according to claim 1, wherein an O-ring is provided as the check valve.

6. The self-pumping hydropneumatic spring strut according to claim 5, wherein the O-ring is received in a circumferential groove arranged at the piston rod guide.

7. The self-pumping hydropneumatic spring strut according to claim 1, wherein the piston pump pumps oil out of the low-pressure chamber into the work space.

8. A piston rod guide comprising:
   a first bore configured to accept a piston rod having a first end and a second end;
   a first seal arranged at the first end of the first bore;
   a second seal arranged at the second end of the first bore; and
   a flow connection arranged between the first and second seals, the flow connection configured to provide a path between the first bore and a low pressure chamber coupled to the piston rod guide.

9. The piston rod guide according to claim 8, further comprising a check valve adapted to substantially seal the flow connection.

10. The piston rod guide according to claim 9, wherein the check valve is an O-ring.

11. The piston rod guide according to claim 8, further comprising a fill tube adapted to a fill a high-pressure coupled to the piston rod guide.

12. The piston rod guide according to claim 11, wherein the fill tube further comprises a valve for closing the fill tube.

* * * * *